(12) United States Patent
Fleury Rey et al.

(10) Patent No.: US 7,297,355 B2
(45) Date of Patent: Nov. 20, 2007

(54) BAKED TYPE AROMATIZING COMPOSITIONS

(75) Inventors: Yvette Fleury Rey, Ursy (CH); Rachid Belrhlid, Epalinges (CH); Marcel Alexandre Juillerat, Laussane (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/733,574

(22) Filed: Dec. 12, 2003

(65) Prior Publication Data

US 2004/0156980 A1  Aug. 12, 2004

Related U.S. Application Data

(63) Continuation of application No. PCT/EP02/05836, filed on May 27, 2002.

(30) Foreign Application Priority Data

Jun. 15, 2001  (EP) .................................. 01114429

(51) Int. Cl.
   *A23L 1/23*  (2006.01)
(52) U.S. Cl. .......................... 426/62; 426/61; 426/496; 426/534; 426/653
(58) Field of Classification Search ................ 426/61, 426/62, 534, 653, 496
   See application file for complete search history.

(56) References Cited

U.S. PATENT DOCUMENTS

| | | | |
|---|---|---|---|
| 3,466,174 A | 9/1969 | Bundus et al. | 99/90 |
| 3,466,176 A | 9/1969 | Bundus et al. | 99/140 |
| 4,218,487 A * | 8/1980 | Jaeggi | 426/533 |
| 4,633,168 A | 12/1986 | Venema | 324/60 |
| 5,011,696 A * | 4/1991 | Haas et al. | 426/28 |
| 5,053,236 A * | 10/1991 | Parliment et al. | 426/234 |
| 5,108,766 A | 4/1992 | Gelinas et al. | 426/43 |
| 5,262,189 A | 11/1993 | Duby et al. | 426/537 |
| 6,432,459 B1 | 8/2002 | Bel Rhlid et al. | 426/62 |

FOREIGN PATENT DOCUMENTS

| | | |
|---|---|---|
| EP | 0 937 402 | 8/1999 |
| EP | 0 951 841 | 10/1999 |
| JP | 749006108 | 2/1974 |
| JP | 2203738 | 8/1990 |
| JP | 7242661 | 9/1995 |

* cited by examiner

*Primary Examiner*—Lien Tran
(74) *Attorney, Agent, or Firm*—Bell, Boyd & Lloyd LLP

(57) ABSTRACT

A process for the preparation of aromatizing compositions suitable for the biogeneration of mixtures of compounds that are able to develop or enhance a typical baked type aroma upon heating of bakery products such as bread an the like. These process includes the bioconversion of at least two amino compounds and at least one reducing sugar in the presence of a yeast. The invention also provides an aromatizing composition, a dough containing the same and methods for imparting an improved baked type aroma to dough products that are to be baked.

14 Claims, 4 Drawing Sheets

BAKED TYPE AROMATIZING COMPOSITIONS

CROSS-REFERENCE TO RELATED APPLICATIONS

This application is a continuation of International application PCT/EP02/05836 filed May 27, 2002, the entire content of which is expressly incorporated herein by reference thereto.

BACKGROUND ART

The present invention relates to a process for the preparation of aromatizing compositions, more particularly the biogeneration of mixtures comprising compounds being able to develop or enhance typical baked type aroma upon heating.

Fresh bread-like aroma is one of the most important criteria of the quality of bakery products and such flavor reflects the freshness of the product. For packaged, chilled and frozen bakery products such as pizza, bread-rolls, croissants, crusts for example, this flavor is often weak mainly because of processing/storage of these products and thus the overall quality of the final product after heating or baking is generally perceived as not close to that of traditional freshly made products.

The bread-like aroma is composed of a complex mixture of odorant compounds identified in the crust of baguette (Zehentbauer G. and Grosh W., 1998. Journal of Cereal Science 28, 81-92.) such as 2-acetyl-1-pyrroline, 2-acetyl-2-thiazoline and pyrazines (responsible for roasted note), furanones (responsible for caramel-like note), ketones and diketones (responsible for buttery note) and aldehydes (responsible for malty note), for example.

Several methods are known to prepare bread-type aromatizing compositions mainly based on Maillard reaction and/or fermentation.

U.S. Pat. No. 4,663,168 discloses a method for preparing a heat-stable yeast fermented malt reaction flavor concentrate from a mixture of malt flour, yeast and fermentable sugar. The method comprises the steps of fermenting a mixture of malt flour by yeast, heating the fermented malt to produce the flavor and inactivating the yeast. The flavor obtained is described as bread crust-like, nutty and toasted grain.

Japanese patent application 7-242,661 discloses the preparation of dimethyl-pyrrolidinyl-furanone and its use for imparting or increasing freshly baked or boiled flavor of bakery foods.

U.S. Pat. No. 6,432,459 describes a process for preparing an aromatizing composition containing 2-acetyl-2-thiazoline and its precursors involving bioconversion of a sulfur containing compound and an organic acid or its derivative in the presence of yeast, separation and recovery of the supernatant. This composition is presented as being able to enhance the roasted notes of bakery products.

U.S. Pat. No. 5,262,189 discloses the use of carbomethoxy-2-pyrroline-1 as aromatizing agent to impart cereal or bread-crust aroma to product in which it is incorporated.

European Patent application 937,402 describes a composition for intensifying the browning and the aroma of baked goods and comprises ascorbic acid, an amino acid, a carbohydrate and a phosphate and optionally lactic acid. This composition is intended to be sprayed onto pre-baked goods and thus both improves the appearance (browning) and intensifies the aroma.

All the previous works already done mainly focused on roasted aroma and moreover the aromatizing compositions obtained were not fully balanced in the different typical aromas and flavors responsible for the global baked aroma. Moreover some of the previous methods were based on pure chemical reaction that is not always desired for food products. Thus, improvements in these type products and their methods of manufacture are desirable.

SUMMARY OF THE INVENTION

The invention relates to a process for the preparation of an aromatizing composition, which comprises conducting a bioconversion of a mixture at least two amino compounds selected from the group consisting of amino acids and peptides and at least one reducing sugar in the presence of a yeast under conditions sufficient to form the aromatizing composition. The aromatizing composition may be recovered by separating a supernatant comprising the aromatizing composition from the mixture after the bioconversion. If desired, the supernatant can be dried to obtain the aromatizing composition in the form of a powder.

The invention also relates to a process for generating a baked aroma which comprises heating a n aromatizing composition obtainable by the process to release a baked aroma therefrom. To do this, the heating is typically carried out at a temperature of from 90 to 200° C. for 5 to 360 minutes.

Another embodiment of the invention is an aromatizing composition obtainable by the process. This composition can be in liquid or preferably is in a dry form.

Yet another embodiment of the invention is a dough composition comprising a sufficient amount of the aromatizing composition so that, when the dough composition is baked, a baked aroma is released from the aromatizing composition.

Finally, another embodiment of the invention relates to a method for making a bakery product having an improved aroma which comprises mixing flour, water, yeast and the aromatizing composition to form a dough mixture, kneading the mixture to form a dough, fermenting the dough, and baking the dough at a temperature and for a time sufficient to bake the dough and release a baked aroma from the aromatizing composition.

DETAILED DESCRIPTION OF THE PREFERRED EMBODIMENTS

Figure 1:
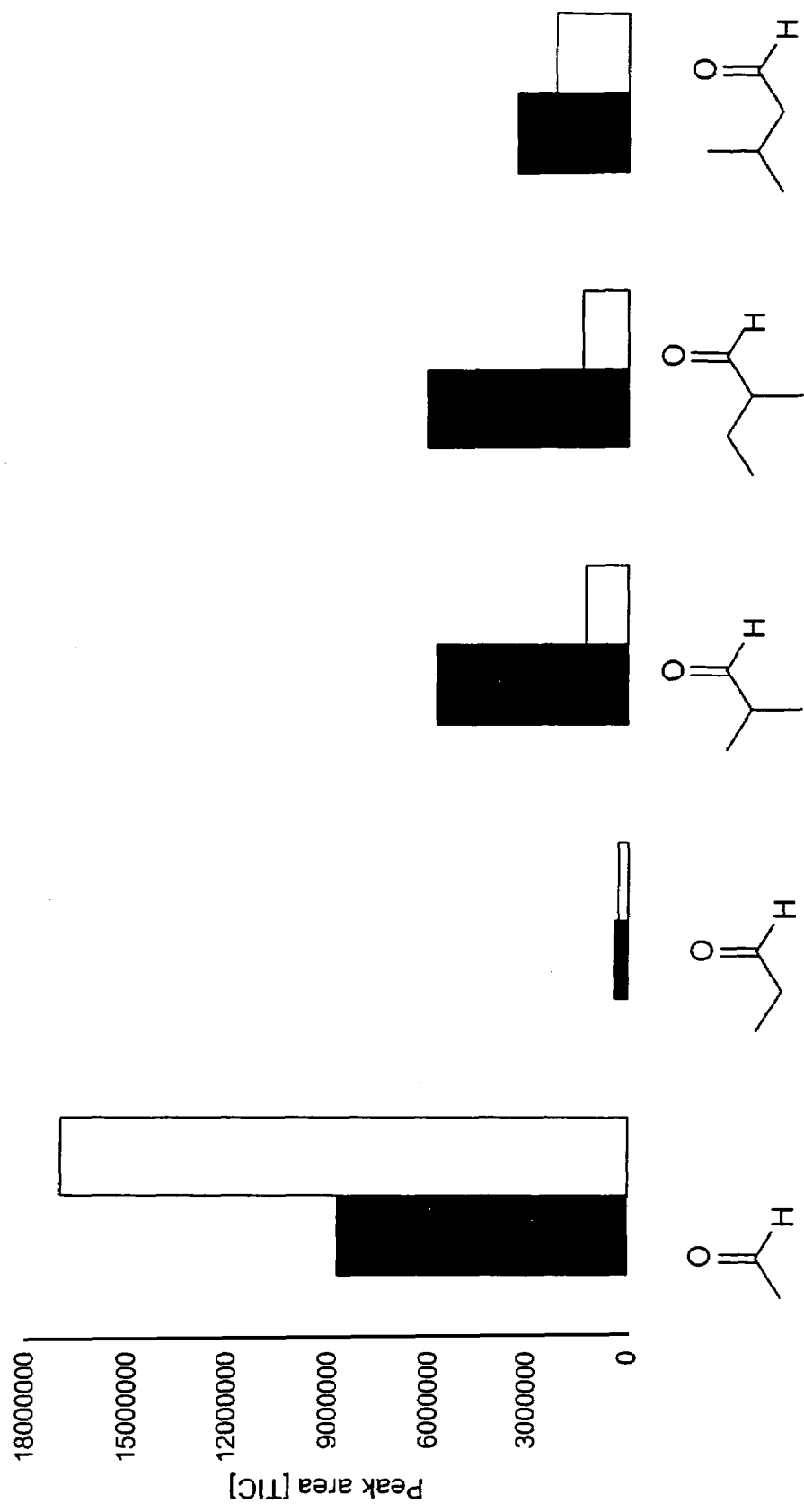
FIG. 1 is a graph that illustrates the amount of Aldehydes that are generated by heat treatment of A1F powder (■) for 45 min or A1 aqueous solution (□) for 2h30, at 100° C.

The present invention now provide a new and natural route for the manufacture of a well balanced baked aroma precursors composition which generates this baked aroma upon heating. To this end, the process for the preparation of an aromatizing composition according to the present invention, comprises the bioconversion of at least two amino compounds selected from the group consisting of amino acids and peptides and at least one reducing sugar in the presence of a micro-organism selected from the group consisting of yeasts.

The reaction mixture can advantageously be then submitted to a separation step, for example by centrifugation, so as to remove the cells from the reaction mixture. The obtained supernatant is usable as an aromatizing composition for baked aroma generation upon heating either directly in liquid form or after drying in powder form obtained by mild dehydration methods, such as freeze-drying for example.

The amino acids to be subjected to the bioconversion may be advantageously selected from the group consisting of arginine, citrulline, glutamine, ornithine and proline. In the case of the use of peptides, the preferred forms consist of di-peptides and/or tripeptides of such chosen amino acids.

The reducing sugar of the mixture may be a mono or oligosaccharide starting from mono to tetra-saccharide, preferably a mono-saccharide and more preferably a C5 or C6 mono-saccharide. Thus the most preferred reducing sugar may be selected from the group consisting of fructose, glucose and rhamnose.

The combination of such compounds incubated with a micro-organism selected in the group consisting of yeasts allows to obtain a mixture containing key aroma precursors which can generate a fully rich and well-balanced baked aroma upon heating.

Preferred micro-organism used for the bioconversion may be baker's yeast belonging to the genus *Saccharomyces cerevisiae* for example in the form of a powder, an extract, a compressed form or a cream solution. However other kind of micro-organisms may be used, such as *Saccharomyces bayanus, Candida versatilis* or *Debaromyces hansenii*. Preferably, the yeast is freshly prepared, or up to 8 days old, advantageously up to 4 days old and kept in the refrigerator.

Regarding the respective quantities of the two starting substrate products, they can be such that the molar ratio between the amino compounds and the reducing sugar is about 1:1 or up to about 1:10. The concentration of these substrates in the reaction medium may range from about 10 to 1000 mMol, preferably from about 20 to 300 mMol.

Generally a yeast solution for bioconversion is used with a dry matter of from about 10 to 30%, preferably about 20% and more preferably about 17%. The substrate quantity may be used as from 10 to 100 mmol for about 100 ml of yeast solution showing about 20% dry matter. However, such range may be adjusted according to the yeast and the substrates concerned.

The incubation of substrates with yeasts, in other word, the bioconversion may be carried out either under aerobic or anaerobic conditions during 2 to 48 hours, preferably 6 to 12 hours and at a pH of about 5 to 8, preferably about 7. The pH value of the medium may be controlled and may be kept constant throughout the bioconversion and may thus be performed by means of a pH-stat, for example. The temperature of the bioconversion may range from about 20 to 50° C., preferably around 30 to 35° C., and may be carried out under low, medium or high agitation conditions.

The reaction medium may be water or any buffer solution with a typical one being a phosphate buffer system.

The reaction is initiated by the addition of the substrates to the medium containing the micro-organism; this addition of substrates may be carried out in one time or in several times. For example, the total amount of reducing sugar may be added in two parts, one half at time 0 and one half afterward during the bioconversion.

As already mentioned, the reaction mixture advantageously may be submitted after bioconversion to a separation step, so as to recover the liquid phase from the cells. This separation step may be carried out by centrifugation, decantation, filtration or ultrafiltration, for example. The liquid phase may either be used as such as an aromatizing composition or dried into a powder using mild conditions by freeze drying, for example. The powdering step may be carried out with or without support material such as maltodextrine, cyclodextrine or starch.

The aromatizing composition obtained by the process according to the present invention is able to generate a rich baked aroma upon heating; either heated in its liquid or powder form. The typical flavor obtained upon heating of the present aromatizing composition can be described after sensory analysis as a fully rich and well balanced freshly baked aroma and can thus be characterized as roasted, bread crust-like, caramel-like, buttery and somewhat honey or yeasty as well.

Figure 2:
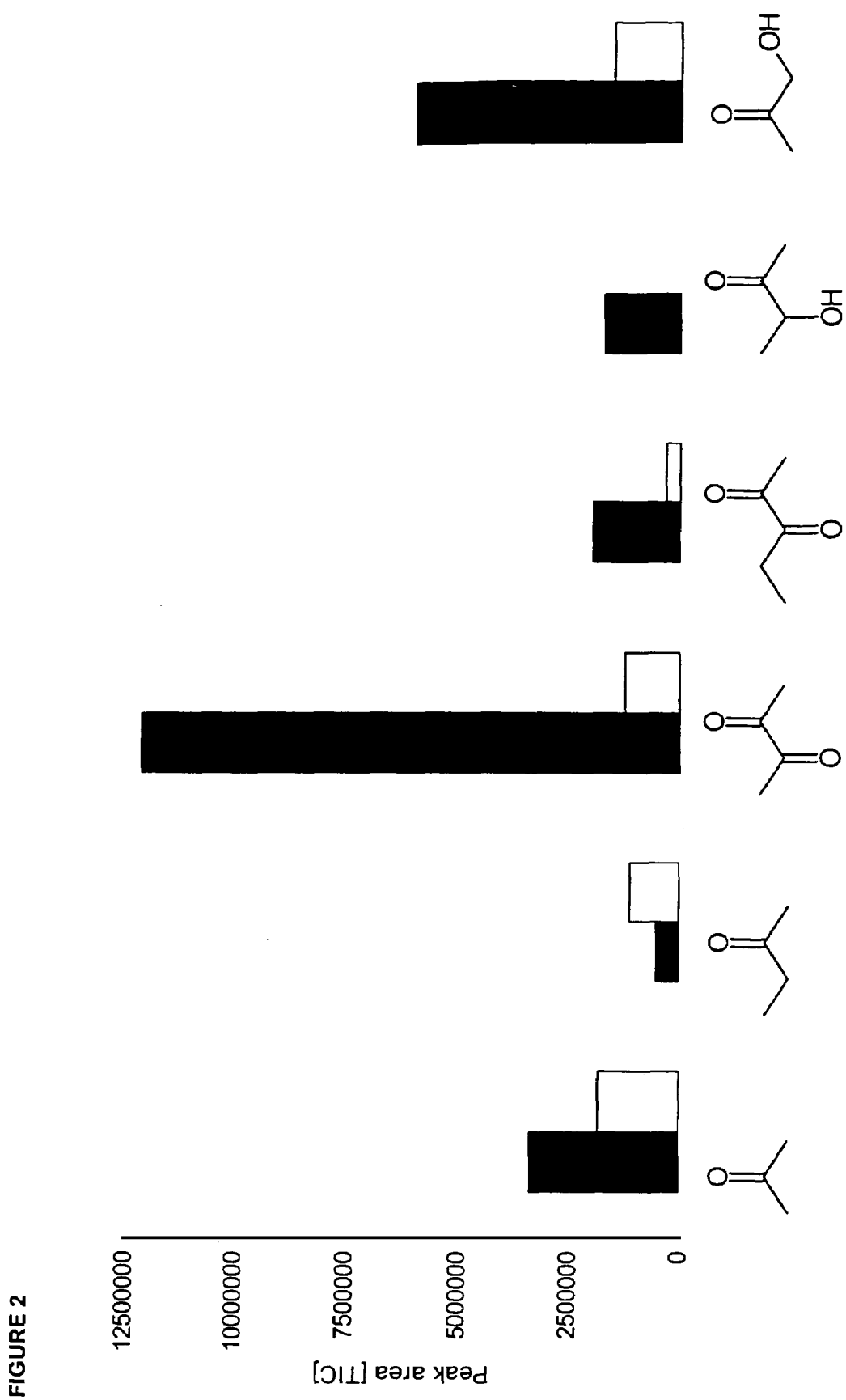
FIG. 2 is a graph that illustrates the amount of Ketones that are generated by heat treatment of A1F powder (■) for 45 min or A1 aqueous solution (□) for 2h30, at 100° C.
Figure 3:
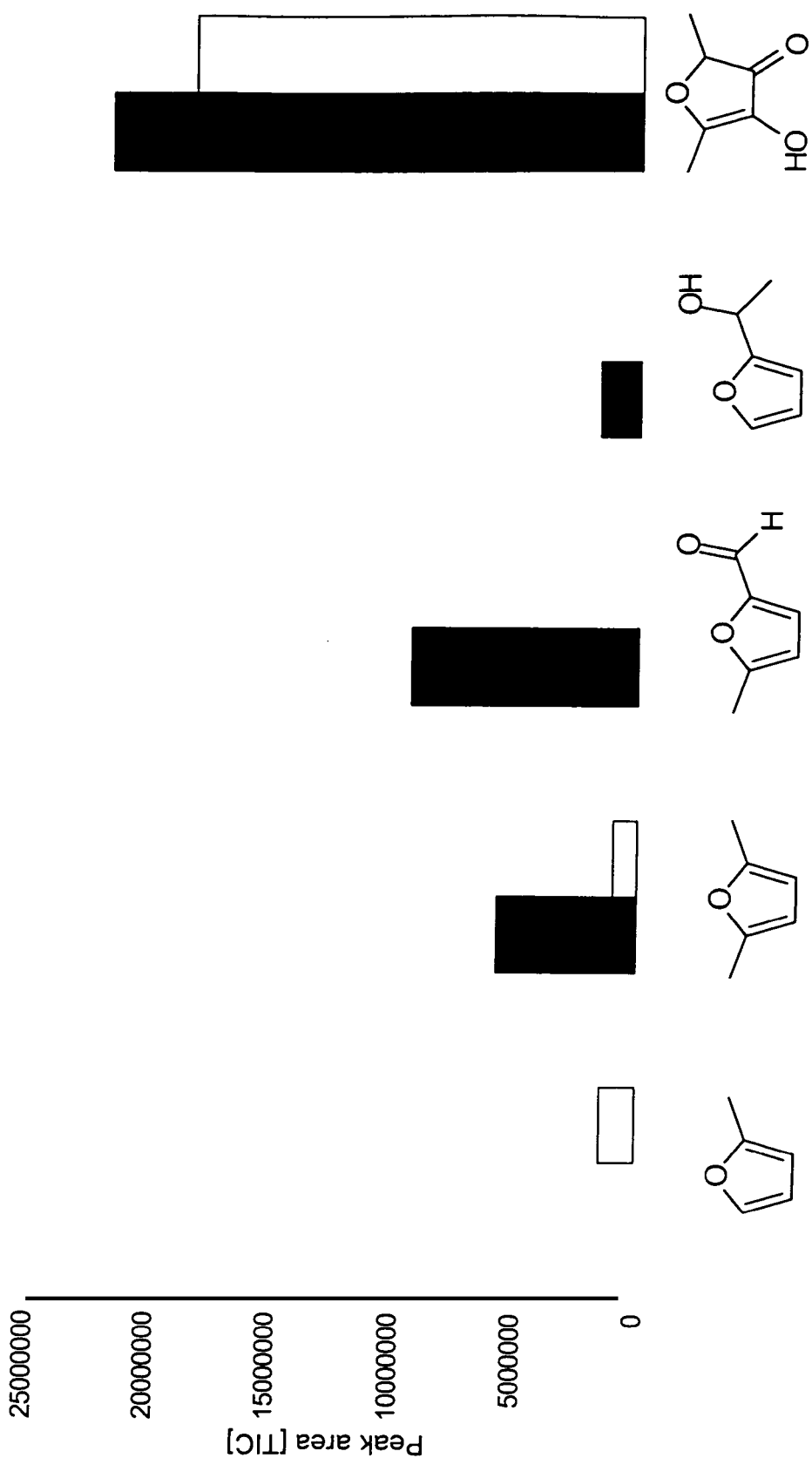
FIG. 3 is a graph that illustrates the amount of Furane derivatives generated by heat treatment of A1F powder (■) for 45 min or A1 aqueous solution (□) for 2h30, at 100° C.
Figure 4:
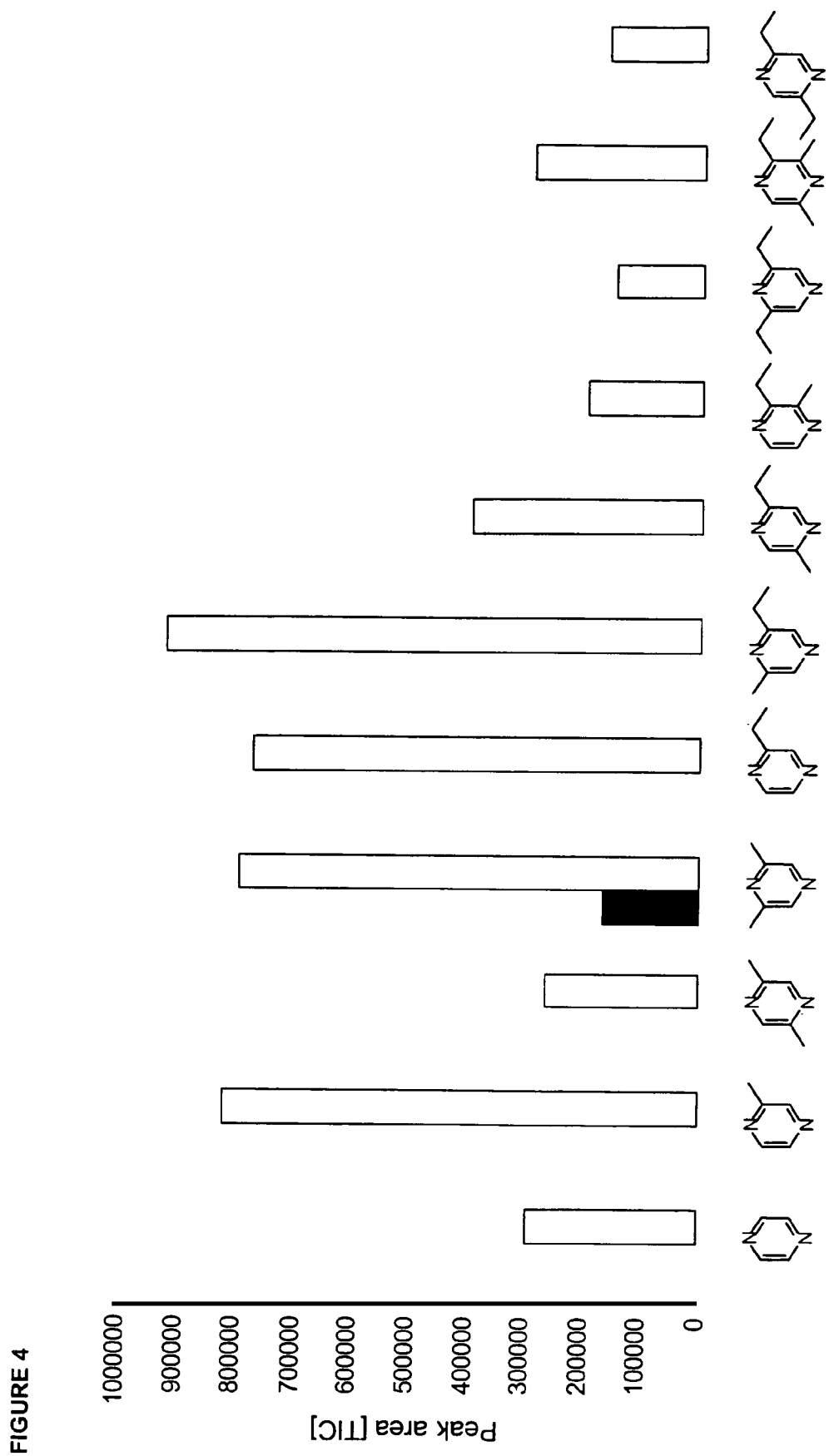
FIG. 4 is a graph that illustrates the amount of Alkyl-pyrazines generated by heat treatment of A1F powder (■) for 45 min or A1 aqueous solution (□) for 2h30, at 100° C.

As previously exposed, the baked aroma is composed of a complex mixture of odorants compounds among which we can cite aldehydes, ketones and diketones, furane derivatives and alkylpyrazines. The typical flavor obtained upon heating of the aromatizing composition obtained according to the present process is mainly due to the presence of such kind of compounds. Hence, several furane derivatives such as furaneol has been identified after heating the composition according to the invention. Five aldehydes were also identified and among them methylpropanal, 2-methylbutanal and 3-methylbutanal were the target molecules exhibiting malty notes. Among the ketones identified, we can cite diacetyl, 2,3-pentanedione responsible for buttery note of bread crust aroma; moreover 3-hydroxy-2-butanone and 1-hydroxy-2-propanone were also identified exhibiting buttery and caramel-like notes. Concerning the alkyl-pyrazines generated, the smell of all these molecules was described as nutty and roasted with nuances from one to each other. The detailed results concerning the nature and relative quantities of these compounds can be seen in FIGS. 1 to 4.

The heat treatment that reveals the baked aroma of the aromatizing composition may be carried out directly on the composition itself, either in liquid or in powder form. However the heat treatment may also be done through heating of a foodstuff containing the aromatizing composition obtained by the process of the present invention.

The conditions for the heat treatment may be the followings: 90 to 200° C. during 5 to 360 minutes depending on the form—liquid or powder—of the aromatizing composition and on its concentration in flavor precursors. As already said, the heating treatment upon which the bread aroma develops may also be carried out through the heating of the foodstuff in which the aromatizing composition has been introduced. Hence, the aromatizing composition obtained according to the present process may be introduced into a dough or into a dough based product and thus will generate and/or enhance the baked aroma upon the baking/heating of the product.

The products that may be concerned by the use of the aromatizing composition obtained according to the present process may be bread doughs, pizza doughs, cereal products, biscuit snacks and batter doughs, cracker doughs, wafer doughs, croissants and the like, for example. However, the use of the present aromatizing composition is not limited to dough based products and may be used for any kind of food products intended to be heated, reheated, baked, toasted or whose manufacture process comprises a heating step and for which a typical fresh baked aroma is desired. Among such product we can cite breakfast cereals, cereals bars, cereal based confectionaries, beverages and pet foods, for example. All the products concerned by the use of the present aromatizing composition may be fresh, shelf-stable, chilled or frozen products. Hence, the original aromatizing composition before any heating treatment may also be added to the various constituents and ingredients to be heated or applied as a coating for example by pulverizing the liquid composition onto prebaked or unbaked bakery products. Despite that, the aromatizing composition obtained by the bioconversion process according to the present invention may also be heated as such in order to obtain a baked aroma composition that may be added in, sprayed or sprinkled onto food products.

Thus, the present invention also concerns a method for making a bakery product having an improved aroma comprising the steps of mixing flour, water, yeast and an aromatizing composition obtained by bioconversion of at least two amino compounds selected from the group consisting of amino acids and peptides and at least one reducing sugar in the presence of a micro-organism selected in the group consisting of yeasts, kneading all ingredient in order to obtain a dough, fermenting the dough and baking the dough.

Such a method allows to obtain full baked aroma or enhance the aroma of bakery products even in the case of short fermentation time.

In an other embodiment, the present invention also concerns the use of the aromatizing composition obtained by the present bioconversion process in non fermented/non yeasted doughs in order to impart to such products a typical baked aroma.

Indeed, for non yeast-leavened dough, the aroma profile lacks the typical baked aroma. Thus the invention refers to a method for making a bakery product having an improved aroma comprising the steps of mixing at least flour, water and a aromatizing composition obtained by bioconversion of at least two amino compounds selected from the group consisting of amino acids and peptides and at least one reducing sugar in the presence of a micro-organism selected in the group consisting of yeasts, kneading all ingredient in order to obtain a dough and baking the dough.

The product thus obtained, despite the lack of yeast and fermenting step, exhibits an enhanced aroma and flavor profile typical to fresh bakery products.

EXAMPLES

The present invention will now be illustrated by reference to the following examples.

Example 1

Preparation of Aromatizing Composition A1 (Ornithine/Glutamine/Rhamnose)

Active dry baker's yeast (20 g) was added to distilled water (100 ml) and left under stirring for 20 min until complete hydration. The yeast suspension was then centrifuged for 15 min at 3000×g and at 4° C. Supernatant (70-75 ml) was discarded and replaced by the same volume of fresh distilled water. After suspension, the yeast was ready to be used.

Yeast suspension (100 g) was introduced into a glass reactor fitted with 3 necks. The temperature was controlled at 30° C. (oil bath) and the pH was adjusted to 7.5 with 2 M NaOH and kept constant all along the fermentation, using a pH-stat system. Ornithine (2 mmol), glutamine (2 mmol) and rhamnose (10 mmol) were added at time 0 and another portion of rhamnose (10 mmol) was added after 4 hours. After 6 hours incubation time, the reaction mixture was centrifuged for 15 min at 3000×g and at 4° C. to remove yeast cells. The supernatant was recovered as composition A1. A part of this composition was freeze-dried to composition A1F.

Example 2

Preparation of Aromatizing Compositions A2 and A2F (Arginine/Citruline/Fructose)

The procedure was the same as in Example 1 excepted that the quantity of respective components was: 6 mmol of arginine, 6 mmol of citrulline and twice 30 mmol of fructose.

Example 3

Preparation of Aromatizing Compositions A3 and A3F (Arginine/Citruline/Rhamnose)

The procedure was the same as in Example 1 excepted that the quantity of respective components was: 2 mmol of arginine, 2 mmol of citrulline and twice 10 mmol of rhamnose.

Example 4

Preparation of Aromatizing Compositions A4 and A4F (Arginine/Citruline/Glucose)

The procedure was the same as in Example 1 excepted that the quantity of respective components was: 2 mmol of arginine, 2 mmol of citrulline and twice 10 mmol of glucose.

Example 5

Preparation of Aromatizing Compositions A5 and A5F (Ornithine/Glutamine/Glucose)

The procedure was the same as in Example 1 excepted that the quantity of respective components was: 2 mmol of ornithine, 2 mmol of glutamine and twice 10 mmol of glucose.

Example 6

Preparation of Aromatizing Compositions A6 and A6F (Ornithine/Glutamine/Fructose)

The procedure was the same as in Example 1 excepted that the quantity of respective components was: 2 mmol of ornithine, 2 mmol of glutamine and twice 10 mmol of fructose.

Example 7

Generation of Baked Aroma by Heat Treatment

One ml of sample solutions A1 to A6 or 60 mg of freeze dried powder A1F to A6F, prepared as described in Examples 1 to 6 were introduced into a 4 ml vial. The latter was closed, heated for 30, 45 minutes or 2h30 at 100° C. in a multi-block heater and rapidly cooled down in a bath of ice. The sample was ready for sniffing or for further GC analysis.

Concerning the sniffing test, the panelists were asked to describe the aroma quality and intensity. The results of these sniffing tests are shown in the following Table 1.

TABLE I

Aroma generated after heat treatment of aqueous solutions at 100° C. for 30 min.

| Samples | Aroma description |
|---------|-------------------|
| A2 | Roasted, honey, yeasty |
| A6 | Honey, roasted |
| A3 | Roasted (strong), bread crust, caramel-like |
| A1 | Roasted (very strong), bread crust, caramel-like |
| A4 | Roasted (weak), yeasty, off-notes |
| A5 | Roasted (weak), yeasty, off-notes |

Head Space Gas Chromatography Analysis

Equipment:
  Automated Headspace sampler, Agilent Technologies model HP7694 coupled to a gas chromatograph, model 6890, equipped with a mass spectrometry detector, model 5973N
  Capillary column: INNOWax, length: 60 m, inner diameter: 0.25 mm, film thickness: 0.50 µm, Agilent Technologies 19091N-236.
  Oven, Heraeus T5042E Method:

Analysis of Powder:

Sixty mg of powder (A1F), obtained as described in Example 1 were introduced into a vial for automated headspace sampler. The vial was sealed and placed into the autosampler. Headspace analysis was performed without any shaking. Sample vial was heated in the oven set at 100° C. for 5, 10, 15, 20, 30 or 45 min. Sample valve and transfer line were heated at 110 and 120° C. respectively. One extraction of the headspace was taken in single puncture mode. Pressure was applied for 0.2 min in order to fill the sample loop, which was then equilibrated for 0.1 min before injection (3 min) into the GC-MS system. Then GC analysis took place in injection split mode (ratio 10:1). Helium was used as carrier gas with a constant flow of 1.0 ml/min. The column was heated from 40° C. (4 min initial time) to 240° C. at a rate of 4° C./min and hold at 240° C. for 20 min. The mass spectrometer was operated in electron impact mode with source and quadrupole temperatures of respectively 230 and 150° C. Masses were scanned from 20 to 250 Da.

Analysis of Aqueous Solutions:

One ml of aqueous solution (A1) obtained as described in Example 1 or reconstituted by dissolution of 60 mg of freeze dried powder (A1F) in 1 ml of distilled water, was introduced into a vial for automated headspace sampler. As it is recommended not to heat the samples more than 20° C. below boiling temperature to avoid over pressure problems when injecting, samples were preheated in an oven set at 100° C. for 2h30 and rapidly cooled down in a bath of ice. The vials were then introduced into the headspace autosampler and reheated at 80° C. for 10 min. The temperatures of sample valve and transfer line were respectively 90 and 100° C. while all other conditions were identical to those used for the analysis of powders.

Results regarding aromatic compound profiles are presented in FIGS. 1 to 4, which specifically illustrate the amount of Aldehydes (FIG. 1), Ketones (FIG. 2), Furane derivatives (FIG. 3) and alkyl pyrazines (FIG. 4) that are generated by heat treatment of A1F powder (■) for 45 min or A1 aqueous solution (□) for 2h30, at 100° C.;

Example 8

Application to Pizza Dough Models

In order to evaluate the potential of A1 (and A1F) in a product, some application trials on pizza dough were carried out.

Preliminary Trials: Round Table Tasting

Two ways of application of the A1 aromatizing composition were tested: mixed into the dough and as surface coating. The amount of the A1 solution added was the same in all samples, corresponding to 1 g of solution per 50 g of fresh dough. In case of mixture with other ingredients of the dough, the A1 solution replaced a part of the water involved in the recipe, in order to keep the final moisture content similar for both sample and reference.

The pizza doughs were prepared according to the following recipe:

| | |
|---|---|
| Wheat flour: | 100 g |
| Water: | 23 g |
| Sunflower oil: | 6.8 g |
| Salt: | 3.0 g |
| Baker's yeast: | 30 g |

All the ingredients were mixed for 210 seconds in a kneading machine. The mixture was then fermented for 25 min in a fermentation cabinet set at 35° C. and 85% of relative humidity. The obtained dough was laminated to 5 mm thickness, cut as 10 cm diameter raw pizza crusts and fermented for another 25 min period. Finally the samples were docked and prebaked for 8 min at 220° C. before storage at −25° C. until the sensory evaluation day.

In addition to A1 solution, a preheated A1 solution (2 hours at 100° C.) was tested in order to check if the baking conditions were sufficient, insufficient, or detrimental to the generation of bread aroma. Two tasting sessions were organized to select the best sample to be evaluated in triangle test versus a reference.

Session 1: Pizza dough, A1 mixed into the dough

Session 2: Pizza dough, A1 applied as surface coating

In each session, three different pizza crusts were presented: the reference and two spiked samples, one with A1 solution and the other one with the preheated A1 solution. Immediately after baking (8 min, 200° C.), the products were placed under bell-covers fitted with stoppers in order to trap the aroma in the head-space. The 5-6 panelists were asked to compare the different products, focusing on the smell.

This preliminary round table screening revealed the trend of an increased and pleasant bread crust aroma in most of the spiked samples. The sample treated with preheated A1 solution was also considered as pleasant and exhibiting a pleasant bread type aroma, but however slightly weaker than the other samples treated with non-preheated solution.

For all these reasons, the model pizza dough with non preheated A1 solution mixed into the dough was selected for further trials.

Triangle Tests

Triangle tests were performed to verify the impact of the nature of the aromatizing composition (liquid or powder). Equivalent amounts of A1 or A1F (1.0 g of solution or 60 mg of powder per 50 g of fresh dough), were mixed with other ingredients of the recipe of the pizza dough. The pizza crust were placed under bell-covers immediately after baking. 12 panelists were asked to identify which pizza was different out of the three presented following two schemes: 1 reference, 2 spiked samples or 2 references, 1 spiked sample.

The results were exactly the same for both A1 solution and A1F powder. Nine panelists among 12 gave correct answers, meaning that spiked samples were significantly different from the reference with a confidence level of 95%. The panelists were also asked to make free comments to qualify the pizza breads. The main attributes describing the spiked samples were biscuit, bread crust, cracker and buttery, when yeasty and flour-like were attributed to the reference.

As a general conclusion about these application trials, A1 or A1F brought a noticeable pleasant and regularly identified bread crust aroma. Moreover, no off-note was detected throughout the different tasting sessions.

What is claimed is:

1. A process for the preparation of an aromatizing precursor composition, the process comprising:
    conducting a bioconversion of a mixture of at least two individual amino compounds selected from the group consisting of arginine, citrulline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition.

2. The process according to claim 1, wherein the yeast is selected from the group consisting of *Saccharomyces cerevisiae, Saccharomyces bayanus, Candida versatilis, Debaromyces hansenii* and combinations thereof.

3. An aromatizing precursor composition obtainable by the process of claim 1.

4. A process for the preparation of an aromatizing precursor composition, the process comprising:
    conducting a bioconversion of a mixture of at least two amino compounds selected from the group consisting of arginine, citrulline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition; and
    separating a supernatant comprising the aromatizing precursor composition from the mixture after the bioconversion.

5. The process according to claim 4, wherein the supernatant is dried to obtain the aromatizing precursor composition in the form of a powder.

6. A process for the preparation of an aromatizing precursor composition, the process comprising:
    conducting a bioconversion of a mixture of at least two amino compounds selected from the group consisting of arginine, citrulline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition, wherein the aromatizing precursor composition includes a complex mixture of aldehydes, ketones and diketones, furane derivatives, alkylpyrazines and combinations thereof.

7. A process for the preparation of an aromatizing precursor composition, the process comprising:
    conducting a bioconversion of a mixture of at least two amino compounds selected from the group consisting of arginine, citruiline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition, wherein the amino compounds and reducing sugar are present in a molar ratio of 1:1 to 1:10.

8. A process for the preparation of an aromatizing precursor composition, the process comprising:
    conducting a bioconversion of a mixture of at least two amino compounds selected from the group consisting of arginine, citrulline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition, wherein the bioconversion is conducted for 2 to 48 hours at a pH of 5 to 8 and at a temperature of from 20 to 50° C.

9. A process for generating a baked aroma, the process comprising:
    conducting a bioconversion of a mixture of at least two amino compounds selected from the group consisting of arginine, citrulline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form an aromatizing precursor composition; and
    heating the aromatizing precursor composition to release a baked aroma therefrom.

10. The process according to claim 9, wherein the heating is carried out at a temperature of from 90 to 200° C. for 5 to 360 minutes.

11. An aromatizing precursor composition in dry powder form obtainable from the process of claim 5.

12. A dough composition comprising a sufficient amount of an aromatizing precursor composition so that, when the dough composition is baked, a baked aroma is released from the aromatizing precursor composition, the aromatizing precursor composition obtained by a process comprising conducting a bioconversion of a mixture of at least two individual amino compounds selected from the group consisting of arginine, citrulline, glutamine, ornithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition.

13. A method for making a bakery product having an improved aroma, the method comprising:

mixing flour, water, yeast and an aromatizing precursor composition to form a dough mixture;

kneading the mixture to form a dough;

fermenting the dough; and baking the dough at a temperature and for a time sufficient to bake the dough and release a baked aroma from the aromatizing precursor composition, the aromatizing precursor composition obtained by a process comprising conducting a bioconversion of a mixture of at least two individual amino compounds selected from the group consisting of arginine, citrulline, glutamine, omithine, proline and combinations thereof and at least one reducing sugar selected from the group consisting of fructose, glucose, rhamnose, C5 and C6 monosaccharides and combinations thereof in the presence of a yeast under conditions sufficient to form the aromatizing precursor composition.

14. A method for making a bakery product having an improved aroma, the method comprising:

mixing flour, water, yeast and the aromatizing precursor composition of claim 11 to form a dough mixture;

kneading the mixture to form a dough;

fermenting the dough; and baking the dough at a temperature and for a time sufficient to bake the dough and release a baked aroma from the aromatizing precursor composition.

* * * * *